(12) United States Patent
Chu

(10) Patent No.: US 12,127,119 B2
(45) Date of Patent: Oct. 22, 2024

(54) TWT MANAGEMENT AND MANAGEMENT FRAMES FOR MULTI-LINK DEVICES

(71) Applicant: NXP USA, Inc., Austin, TX (US)

(72) Inventor: Liwen Chu, San Ramon, CA (US)

(73) Assignee: NXP USA, Inc., Austin, TX (US)

( * ) Notice: Subject to any disclaimer, the term of this patent is extended or adjusted under 35 U.S.C. 154(b) by 396 days.

(21) Appl. No.: 17/701,614

(22) Filed: Mar. 22, 2022

(65) Prior Publication Data

US 2022/0303893 A1 Sep. 22, 2022

Related U.S. Application Data

(60) Provisional application No. 63/263,746, filed on Nov. 8, 2021, provisional application No. 63/164,121, filed on Mar. 22, 2021.

(51) Int. Cl.
*H04W 76/15* (2018.01)
*H04W 52/02* (2009.01)
*H04W 56/00* (2009.01)

(52) U.S. Cl.
CPC ... *H04W 52/0216* (2013.01); *H04W 56/0015* (2013.01); *H04W 76/15* (2018.02)

(58) Field of Classification Search
CPC ......... H04W 52/0216; H04W 56/0015; H04W 76/15; H04W 76/40
See application file for complete search history.

(56) References Cited

U.S. PATENT DOCUMENTS

| | | | |
|---|---|---|---|
| 2020/0374801 A1 | 11/2020 | Chu et al. | |
| 2021/0266891 A1* | 8/2021 | Chu | H04L 5/1469 |
| 2021/0337613 A1* | 10/2021 | Seok | H04W 76/15 |
| 2021/0377856 A1 | 12/2021 | Chu et al. | |
| 2022/0039183 A1 | 2/2022 | Chu et al. | |
| 2022/0182184 A1* | 6/2022 | Wang | H04L 1/1893 |
| 2022/0264429 A1* | 8/2022 | Gan | H04W 52/0219 |
| 2022/0303893 A1* | 9/2022 | Chu | H04W 56/0015 |
| 2022/0345973 A1* | 10/2022 | Sun | H04W 74/0816 |
| 2023/0049552 A1* | 2/2023 | Chitrakar | H04W 76/18 |
| 2023/0179686 A1* | 6/2023 | Kim | H04W 76/20 370/329 |
| 2023/0217521 A1* | 7/2023 | Kim | H04W 76/15 370/329 |
| 2023/0354160 A1* | 11/2023 | Gan | H04W 52/0229 |
| 2023/0371077 A1* | 11/2023 | Zhou | H04W 76/28 |

* cited by examiner

*Primary Examiner* — Julio R Perez

(57) ABSTRACT

Various embodiments relate to a multi-link device (MLD) access point configured to establish a target wake time (TWT) with a MLD station, wherein a plurality of links are established between the MLD access point and the MLD station, including: a transmitter configured to: transmit a TWT set up frame to the MLD station configured to indicate whether the TWT set up frame is applied to multiple links of the plurality of links; announce a broadcast TWT by transmitting a TWT element with just one Broadcast TWT Parameter Set field if a Broadcast TWT Parameter Set field includes optional fields; and negotiate with the MLD station an individual TWT for multiple links, through one TWT element wherein the number of the multiple links to which the individual TWTs applies is less than or equal than the number of radios of the MLD access point and the MLD station, and the number of the multiple links to which individual TWTs applies is up to the total number of links when the MLD station is in eMLSR/eMLMR mode.

20 Claims, 10 Drawing Sheets

| REQUEST TYPE 212 | TARGET WAKE TIME 214 | TWT GROUP ASSIGNMENT 216 | NOMINAL MINIMUM TWT WAKE DURATION 218 | TWT WAKE INTERVAL MANTISSA 220 | TWT CHANNEL 222 | NDP PAGING (OPTIONAL) 224 | LINK ID BITMAP 226 |
|---|---|---|---|---|---|---|---|
| 2 | 0 or 8 | 0, 3 or 9 | 1 | 2 | 1 | 0 or 4 | 0 or 2 |

OCTETS:

TWT MANAGEMENT AND MANAGEMENT FRAMES FOR MULTI-LINK DEVICES

CROSS-REFERENCE TO RELATED APPLICATIONS

This application claims benefit to U.S. Provisional Patent Application Nos. 63/164,121 filed on Mar. 22, 2021 and 63/263,746 filed on Nov. 8, 2021, the contents of which are hereby incorporated by reference for all purposes as if fully set forth herein.

TECHNICAL FIELD

Various exemplary embodiments disclosed herein relate generally to apparatus and methods of TWT management and management frames for multi-link devices under multi-link operation (MLO).

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a multi-link device (MLD) access point configured to establish a target wake time (TWT) with a MLD station, wherein a plurality of links are established between the MLD access point and the MLD station, including: a transmitter configured to: transmit a TWT set up frame to the MLD station configured to indicate whether the TWT set up frame is applied to multiple links of the plurality of links; announce a broadcast TWT by transmitting a TWT element with just one Broadcast TWT Parameter Set field if a Broadcast TWT Parameter Set field includes optional fields; and negotiate with the MLD station an individual TWT for multiple links, through one TWT element wherein the number of the multiple links to which the individual TWTs applies is less than or equal the number of radios of the MLD access point and the MLD station, and the number of the multiple links to which the individual TWTs applies is up to the total number of links when the MLD station is in eMLSR/eMLMR mode.

Various embodiments are described, wherein a TWT Wake time is the time synchronization function (TSF) time of the link with smallest link ID.

Various embodiments are described, wherein a TWT Wake time is the time synchronization function (TSF) time of the link with largest link ID.

Various embodiments are described, wherein the transmitter is further configured to tear down the individual TWT by transmitting to the MLD AP a single frame that is applied to more than one link.

Various embodiments are described, wherein the transmitter is further configured to send a single frame that may be applied to more than one link to suspend or resume the individual TWT.

Various embodiments are described, wherein a update related to the broadcast TWT includes the insertion of the Broadcast TWT Parameter Set field.

Various embodiments are described, wherein a update related to the broadcast TWT includes the termination of a broadcast TWT agreement through announcing a Reject TWT in a TWT Setup Command field.

Various embodiments are described, wherein a update related to the broadcast TWT includes the update of a broadcast TWT agreement through announcing an Alternate TWT in a TWT Setup Command field.

Various embodiments are described, wherein a Broadcast TWT Parament set filed includes a Broadcast TWT Info filed, and the Broadcast Info field includes a No Member Indication filed that indicates whether there are no members in a restricted TWT.

Various embodiments are described, wherein the MDL STA that supports restricted TWT does not need to stop its transmit opportunity at the beginning of the service period of the restricted TWT when there are no members in the restricted TWT.

Various embodiments are described, wherein a Broadcast TWT Parament set filed includes a Broadcast TWT Info filed, and the Broadcast Info field includes a Full Member Indication filed that indicates whether the MLD access point will accept a membership request for a restricted TWT.

Various embodiments are described, wherein a Broadcast TWT Parament set field includes a restricted TWT Traffic Info field.

Various embodiments are described, wherein the TWT element includes a plurality of Broadcast TWT Parament set fields, and only the last of the plurality of Broadcast TWT Parament set fields includes a restricted TWT Traffic Info field.

Various embodiments are described, wherein when the MLD STA negotiates TWT membership, a temporary channel in a broadcast TWT SP is negotiated in a subchannel selective transmission secondary channel.

Further various embodiments relate to a multi-link device (MLD) access point configured to establish communication with a eMLSR/eMLMR MLD station, including: a transmitter configured to: negotiate individual TWT agreements with the eMLSR/eMLMR MLD STA for links in eMLSR mode using one TWT Request/Response; and exchange frames with the eMLSR/eMLMR MLD station based upon the negotiated individual TWT agreements.

Various embodiments are described, wherein the negotiated individual TWT agreements are accepted in all links in the eMLSR mode.

Various embodiments are described, wherein the negotiated individual TWT agreements are accepted in a subset of links in the eMLSR mode.

Various embodiments are described, wherein the negotiated TWT agreements are synchronized TWT Agreements in all the links that have same TWT parameters except applied links.

Various embodiments are described, wherein the transmitter is further configured to transmit a single TWT suspension/resumption action frame that suspends/resumes the synchronized TWT agreements in all the links.

Various embodiments are described, wherein the transmitter is further configured to transmit a single TWT teardown action frame to tear down the synchronized TWT agreements in all the links.

BRIEF DESCRIPTION OF THE DRAWINGS

In order to better understand various exemplary embodiments, reference is made to the accompanying drawings, wherein:

FIG. 2B illustrates the Individual TWT Parameter Set format;

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. All changes which come within the meaning and range of equivalency of the claims are to be embraced within their scope.

Reference throughout this specification to features, advantages, or similar language does not imply that all of the features and advantages that may be realized by the invention should be or are in any single embodiment of the invention. Rather, language referring to the features and advantages is understood to mean that a specific feature, advantage, or characteristic described in connection with an embodiment is included in at least one embodiment of the invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Figure 1A:
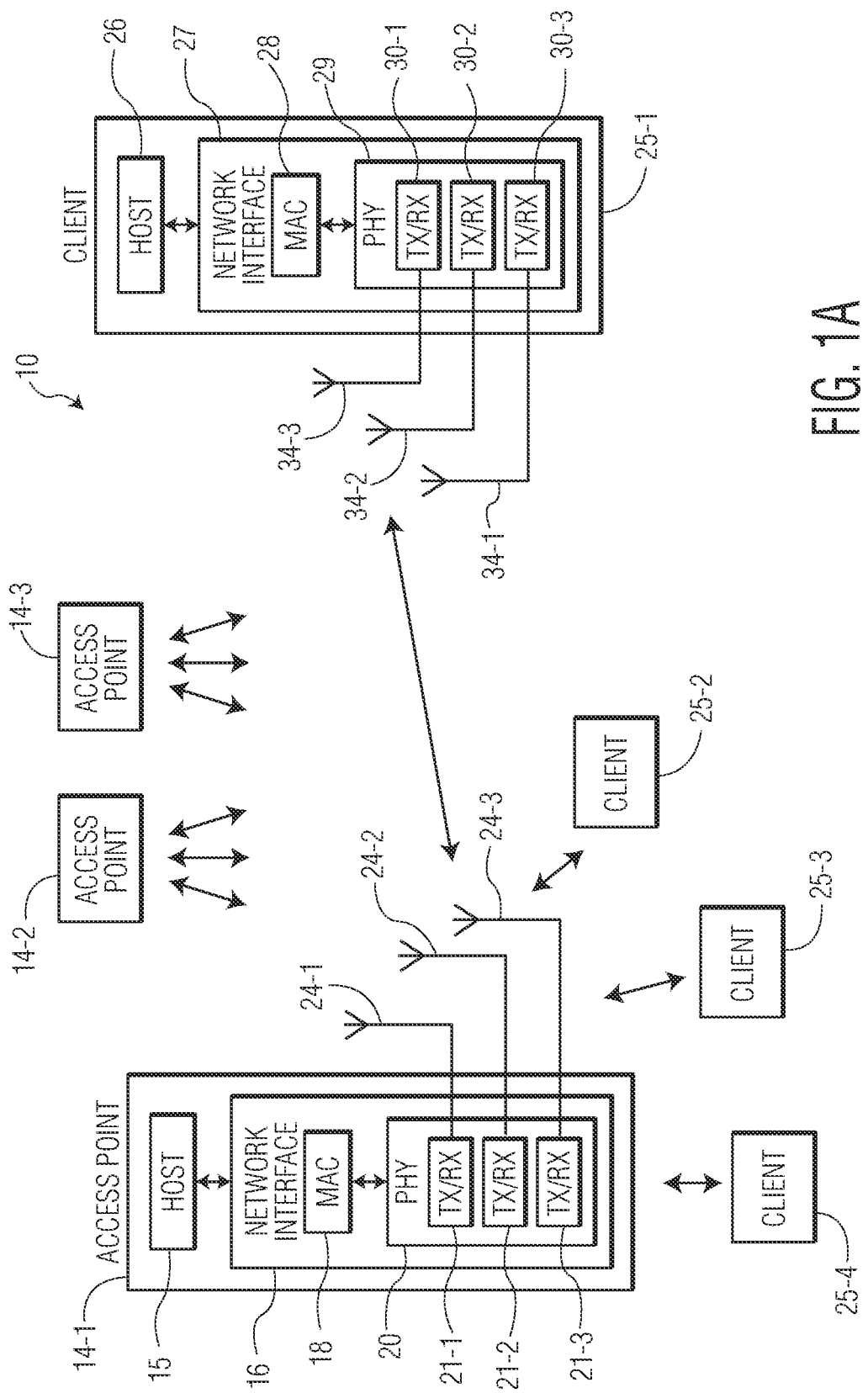
FIG. 1A is a block diagram of an example wireless local area network (WLAN), according to an embodiment.

FIG. 1A is a block diagram of an example wireless local area network (WLAN) 10, according to an embodiment. Such a WLAN 10 may need to be able to update operating parameters across a range of different versions of Wi-Fi or IEEE 802.11. An access point (AP) 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1A, the AP 14 may include different numbers (e.g., 1, 2, 4, 5, etc.) of transceivers 21 and antennas 24 in other embodiments. The WLAN 10 may include multiple APs 14-1, 14-2, 14-3 as shown, but any number of APs 14 may be included in WLAN 10.

The WLAN 10 includes a plurality of client stations (STA) 25. Although four client stations 25 are illustrated in FIG. 1A, the WLAN 10 may include different numbers (e.g., 1, 2, 3, 5, 6, etc.) of client stations 25 in various scenarios and embodiments. The WLAN 10 may also include AP multi-link device (MLD) where one AP MLD includes multiple affiliated APs and client STA multi-link devices (MLD) where one non-AP MLD includes multiple affiliated STAs. Two or more of the STAs of an non-AP MLD 25 are configured to receive corresponding data streams that are transmitted simultaneously by the AP 14. Additionally, two or more of the STAs of an non-AP MLD 25 are configured to transmit corresponding data streams to one AP MLD 14 such that the AP MLD 14 simultaneously receives the data streams. Also, the client station MLD 25 are configured to receive data streams that are transmitted simultaneously by multiple APs of one AP MLD 14. Likewise, the STAs of an non-AP MLD 25 may transmit data streams simultaneously to the multiple APs of an AP MLD 14. MLD devices and operation will be described in more detail below.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1A, the client station 25-1 may include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the APs 14 and the client stations 25 contend for communication medium using carrier sense multiple access with collision avoidance (CSMA/CA) protocol or another suitable medium access protocol. Further, in an embodiment, the APs 14 or a client station 25 dynamically selects a bandwidth for a transmission based on channels available for the transmission.

In an embodiment, the APs 14 are configured to simultaneously transmit different orthogonal frequency division multiplexing (OFDM) units to different client stations 25 by forming an orthogonal frequency division multiple access (OFDMA) resource unit (RU) that includes the different OFDM RUs modulated in respective sub-channel blocks of the OFDMA RU. In an embodiment, the AP 14 allocates different sub-channels to different client stations and forms the OFDMA RU that includes OFDM RUs directed to by modulating the different client stations in sub-channel blocks corresponding to the sub-channels assigned to the client stations.

In an embodiment, the APs 14 are configured to simultaneously transmit different OFDM units to different client stations 25 by transmitting the different OFDM RUs via different space time streams of a MU-MIMO communication channel to a single user (SU) or multiple users. In an embodiment, the APs 14 allocates different sub-channels and space time streams to different client stations and forms the OFDM RUs and modulates the different OFDM RUs to the space time streams corresponding to the sub-channels assigned to the client stations.

Various iterations of the 802.11 specification are referred to herein. IEEE 802.11ac is referred to as very high throughput (VHT). IEEE 802.11ax is referred to as high efficiency (HE). IEEE 802.11be is referred to as extreme high throughput (EHT). The terms VHT, HE, and EHT will be used in the descriptions found herein.

As described above a multi-link AP MLD has multiple links where each link has one AP affiliated with the AP MLD. This may be accomplished by having two different radios.

A multi-link STA MLD has one or multiple links where each link has one AP affiliated with the AP MLD. One way to implement the multi-link STA MLD is using two or more radios, where each radio is associated with a specific link. Another way to implement the multi-link STA MLD is using a single radio in two different bands. Each band may be associated with a specific link. In this case only one link is available at a time. In yet another implementation, an enhanced single-radio (ESR) STA MLD may be used. The ESR STA MLD uses two radios in different bands to implement the STA. For example, on radio may be a lower cost radio with lesser capabilities and the other radio may be a fully functional radio supporting the latest protocols. In another implementation, the an ESR STA MLD may include more than one low cost radio. The ESR STA MLD may dynamically switch its full functional radio while it can only transmit or receive through one link at any time. The ESR STA MLD may monitor two links or more than two links simultaneously, for example, detecting medium idle/busy status of each link, or receiving a PPDU on each link. The STA in each link may have its own backoff procedure, and when the backoff counter of the STA in one of the links becomes zero that link may be used for transmission. The STA of STA MLD may do the frame exchanges with the AP MLD in the link without transmitting the specific initial control frame for radio switch since the AP MLD is not ESR MLD. In another implementation, if an AP of an AP MLD in a link wants to do the frame exchanges with ESR STA MLD in the link, it may send a control frame that is long enough for the ESR STA MLD to switch the fully functional radio to the link, that may then transmit data to the ESR STA MLD. Generally speaking, when a MLD wants exchange frames in a link with a peer MLD that is an ESR MLD, the MLD (STA or AP of the MLD in the link) needs to send a control frame that is long enough for the peer ESR MLD to switch the fully functional radio to the link.

In embodiments of a wireless communications system, a wireless device, e.g., an AP MLD of the WLAN may transmit data to at least one associated STA MLD. The AP MLD may be configured to operate with associated STA MLDs according to a communication protocol. For example, the communication protocol may be an Extremely High Throughput (EHT) communication protocol. Features of wireless communications and multi-link communication systems operating in accordance with the EHT communication protocol and/or next-generation communication protocols may be referred to herein as "non-legacy" features. In some embodiments of the wireless communications system described herein, different associated STAs within range of an AP operating according to the EHT communication protocol are configured to operate according to at least one other communication protocol, which defines operation in a BSS with the AP, but are generally affiliated with lower data throughput protocols. The lower data throughput communication protocols (e.g., HE, VHT, etc.) may be collectively referred to herein as "legacy" communication protocols.

Figure 1B:
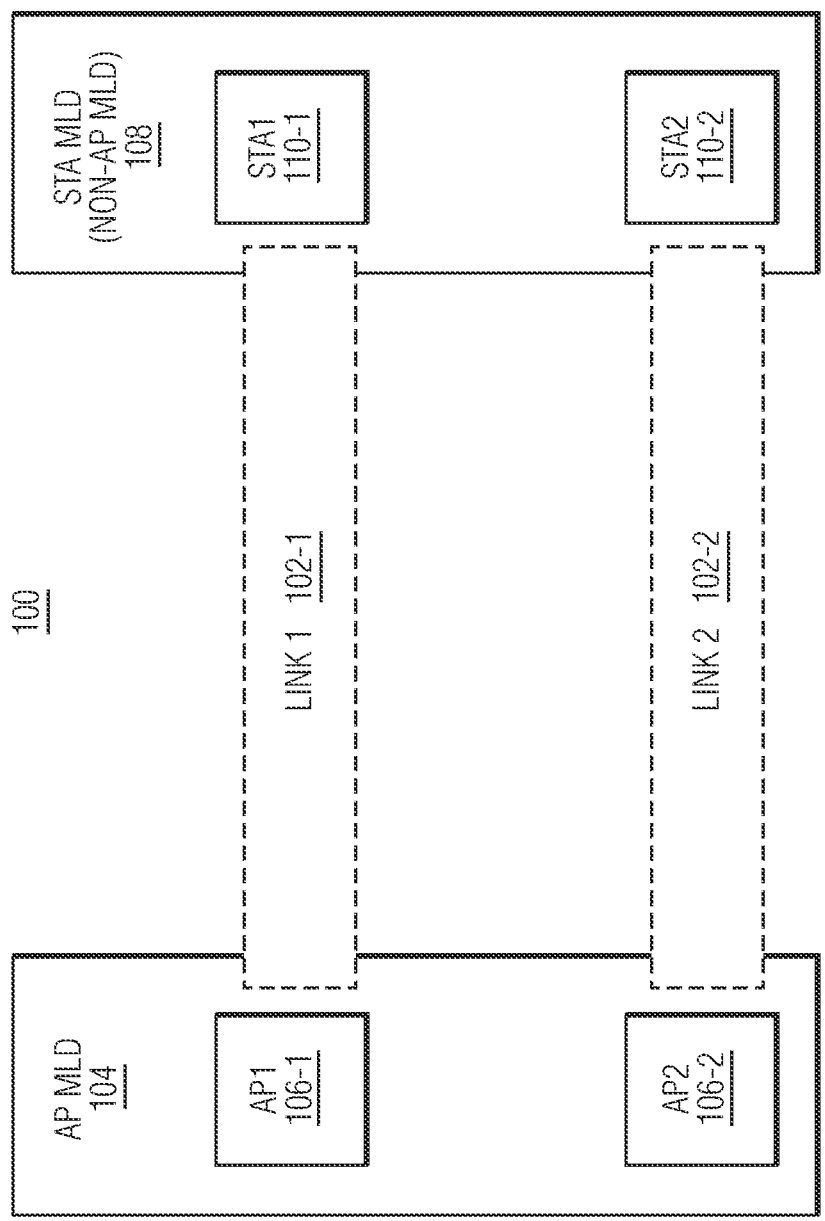
FIG. 1B illustrates a multi-link communications system that is used for wireless (e.g., Wi-Fi) communications.

FIG. 1B illustrates a multi-link communications system 100 that is used for wireless (e.g., Wi-Fi) communications. In the embodiment depicted in FIG. 1B, the multi-link communications system includes one AP multi-link device, which is implemented as AP MLD 104, and one non-AP STA multi-link device, which is implemented as STA MLD 108. The AP MLD 104 may be an AP 14-1 as described in FIG. 1A. The non-AP STA may be a client 25-1 as described in FIG. 1A. The multi-link communications system may be used in various applications, such as industrial applications, medical applications, computer applications, and/or consumer or enterprise applications. In some embodiments, the multi-link communications system may be a wireless communications system, such as a wireless communications system compatible with an IEEE 802.11 protocol. For example, the multi-link communications system may be a wireless communications system compatible with the EHT protocol. Although the depicted multi-link communications system 100 is shown in FIG. 1B with certain components and described with certain functionality herein, other embodiments of the multi-link communications system may include fewer or more components to implement the same, less, or more functionality. For example, in some embodiments, the multi-link communications system includes a single AP MLD with multiple STA MLDs, or multiple AP MLDs with more than one STA MLD. In another example, although the multi-link communications system is shown in FIG. 1B as being connected in a certain topology, the network topology of the multi-link communications system is not limited to the topology shown in FIG. 1B.

In the embodiment depicted in FIG. 1B, the AP MLD 104 includes two radios, implemented as APs 106-1 and 106-2. In such an embodiment, the APs may be AP1 106-1 and AP2 106-2. In some embodiments, a common part of the AP MLD 104 implements upper layer MAC functionalities (e.g., beacon acknowledgement establishment, reordering of frames, etc.) and a link specific part of the AP MLD 104, i.e., the APs 106-1 and 106-2, implement lower layer MAC functionalities (e.g., backoff, frame transmission, frame reception, etc.). The APs 106-1 and 106-2 may be implemented in hardware (e.g., circuits), software, firmware, or a combination thereof. The APs 106-1 and 106-2 may be fully or partially implemented as an integrated circuit (IC) device. In some embodiments, the APs 106-1 and 106-2 may be wireless APs compatible with at least one WLAN communications protocol (e.g., at least one IEEE 802.11 protocol). For example, the APs 106-1 and 106-2 may be wireless APs compatible with the EHT protocol.

In some embodiments, an AP MLD (e.g., AP MLD 104) connects to a local area network (e.g., a LAN) and/or to a backbone network (e.g., the Internet) through a wired connection and wirelessly connects to wireless STAs, for example, through one or more WLAN communications protocols, such as the IEEE 802.11 protocol. In some embodiments, an AP (e.g., AP1 106-1 and/or AP2 106-2)

includes at least one antenna, at least one transceiver operably connected to the at least one antenna, and at least one controller operably connected to the corresponding transceiver. In some embodiments, the at least one transceiver includes a physical layer (PHY) device. The at least one controller may be configured to control the at least one transceiver to process received packets through the at least one antenna. In some embodiments, the at least one controller may be implemented within a processor, such as a microcontroller, a host processor, a host, a digital signal processor (DSP), or a central processing unit (CPU), which can be integrated in a corresponding transceiver. In some embodiments, each of the APs 106-1 or 106-2 of the AP MLD 104 may operate in a different BSS operating channel. For example, AP1 106-1 may operate in a 320 MHz BSS operating channel at 6 GHz band and AP2 106-2 may operate in a 160 MHz BSS operating channel at 5 GHz band. Although the AP MLD 104 is shown in FIG. 1A as including two APs, other embodiments of the AP MLD 104 may include more than two APs.

In the embodiment depicted in FIG. 1B, the non-AP STA multi-link device, implemented as STA MLD 108, includes two links which are implemented as non-AP STAs 110-1 and 110-2. In such an embodiment, the non-AP STAs may be STA1 110-1 and STA2 110-2. The STAs 110-1 and 110-2 may be implemented in hardware (e.g., circuits), software, firmware, or a combination thereof. The STAs 110-1 and 110-2 may be fully or partially implemented as an IC device. In some embodiments, the non-AP STAs 110-1 and 110-2 are part of the STA MLD 108, such that the STA MLD may be a communications device that wirelessly connects to a wireless AP MLD. For example, the STA MLD 108 may be implemented in a laptop, a desktop personal computer (PC), a mobile phone, or other communications device that supports at least one WLAN communications protocol. In some embodiments, the non-AP STA MLD 108 is a communications device compatible with at least one IEEE 802.11 protocol (e.g., the IEEE 802.11be or EHT protocol). In some embodiments, the STA MLD 108 implements a common MAC data service interface and the non-AP STAs 110-1 and 110-2 implement a lower layer MAC data service interface.

In some embodiments, the AP MLD 104 and/or the STA MLD 108 may identify which communication links support multi-link operation during a multi-link operation setup phase and/or exchanges information regarding multi-link capabilities during the multi-link operation setup phase. In some embodiments, each of the non-AP STAs 110-1 and 110-2 of the STA MLD 108 may operate in a different frequency band. For example, the non-AP STA 110-1 may operate in the 2.4 GHz frequency band and the non-AP STA 110-2 may operate in the 5 GHz frequency band. In some embodiments, the non-AP STAs 110-1 and 110-2 of the STA MLD 108 may operate in different channels of the same band. In some embodiments, each STA includes at least one antenna, at least one transceiver operably connected to the at least one antenna, and at least one controller connected to the corresponding transceiver. In some embodiments, the at least one transceiver includes a PHY device. The at least one controller may be configured to control the at least one transceiver to process received packets through the at least one antenna. In some embodiments, the at least one controller may be implemented within a processor, such as a microcontroller, a host processor, a host, a DSP, or a CPU, which can be integrated in a corresponding transceiver.

In the embodiment depicted in FIG. 1B, the STA MLD 108 communicates with the AP MLD 104 via two communication links, e.g., link 1 102-1 and link 2 102-2. For example, each of the non-AP STAs 110-1 or 110-2 communicates with an AP 106-1 or 106-2 via corresponding communication links 102-1 or 102-2. In an embodiment, a communication link (e.g., link 1 102-1 or link 2 102-2) may include a BSS operating channel established by an AP (e.g., AP1 106-1 or AP2 106-2) that features multiple 20 MHz channels used to transmit frames (e.g., Physical Layer Convergence Protocol (PLCP) Protocol Data Units (PPDUs), Beacon frames, management frames, etc.) between a first wireless device (e.g., an AP, an AP MLD, an STA, or an STA MLD) and a second wireless device (e.g., an AP, an AP MLD, an STA, or an STA MLD). In some embodiments, a 20 MHz channel of BSS operating channel may be a punctured 20 MHz channel or an unpunctured 20 MHz channel. Although the STA MLD 108 is shown in FIG. 1B as including two non-AP STAs, other embodiments of the STA MLD 108 may include one non-AP STA or more than two non-AP STAs. In addition, although the AP MLD 104 communicates (e.g., wirelessly communicates) with the STA MLD 108 via multiple links 102-1 and 102-2, in other embodiments, the AP MLD 104 may communicate (e.g., wirelessly communicate) with the STA MLD 108 via more than two communication links or less than two communication links.

In some embodiments, a first MLD, e.g., an AP MLD or non-AP MLD (STA MLD), may transmit management frames in a multi-link operation with a second MLD, e.g., STA MLD or AP MLD, to coordinate the multi-link operation between the first MLD and the second MLD. As an example, a management frame may be a (Re)Association Request frame, a (Re)Association Response frame, a Beacon frame, a Disassociation frame, an Authentication frame, a ADDBA Request/Response Action frame, etc. According to the EHT communication protocol, management frames may be transmitted via a cross-link transmission. As an example, a cross-link management frame transmission may involve a management frame being transmitted and/or received on one link (e.g., link 1 102-1) while carrying information of another link (e.g., link 2 102-2). Thus, frame formats and transmission techniques for management frames transmitted and/or received via a cross-link transmission may need to be defined for MLDs operating in accordance with the EHT communication protocol.

Target Wake Time (TWT) enables devices to determine when and how frequently they will wake up to send or receive data. Essentially, this allows access points that implement TWT to effectively increase device sleep time and significantly conserve battery life, a feature that is particularly important for the Internet of Things (IoT). In addition to saving power on the client device side, TWT enables wireless access points and devices to negotiate and define specific times to access the medium. This helps optimize spectral efficiency by reducing contention and overlap between users.

The TWT mechanism is specifically designed to support the large-scale deployment of IoT infrastructure—such as stations and sensors—that intelligently coordinate signal sharing. The TWT feature further evolved with the HE standard, as stations and sensors are now only required to wake and communicate with the specific Beacon(s) transmitting instructions for the TWT Broadcast sessions they belong to. This allows the wireless HE standard to optimize power saving for many devices, with more reliable, and deterministic performance. TWT also facilitates fully maximizing new MU capabilities in HE by supporting the scheduling of both multi-user download (MU-DL) and multi-user upload (MU-UL) transmissions. In addition, TWT can be used to collect information from stations, such as channel sounding and buffers occupancy in pre-defined periods. Last, but certainly not least, TWT may potentially help multiple WLANs in dense deployment scenarios reach consensus on non-overlapping schedules to further improve Overlapping Basic Service Set (OBSS) co-existence.

Figure 2A:
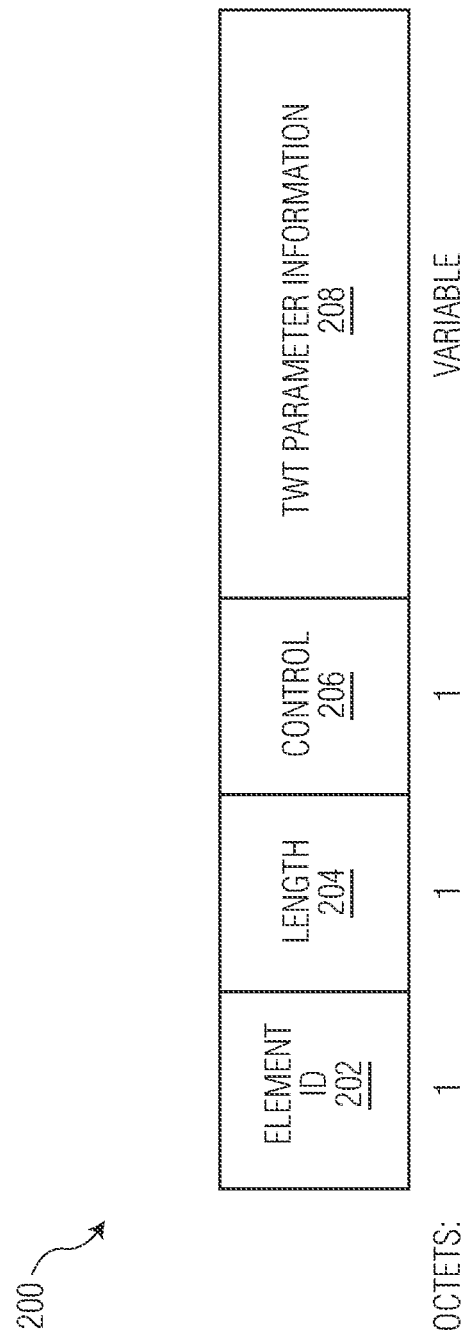
FIG. 2A illustrates the TWT element format.

FIG. 2A illustrates the TWT element format. The TWT element 200 includes the following fields: Element ID 202; Length 204; Control 206, and TWT Parameter Information 208. The TWT Parameter Information field 208 may include one Individual TWT Parameter Set or one or more Broadcast TWT Parameter Set(s). FIG. 2B illustrates the Individual TWT Parameter Set format. The Individual TWT Parameter Set includes the following fields: Request Type 212; Target Wake Time 214; TWT Group Assignment 216; Nominal Minimum TWT Wake Duration 218; TWT Wake Interval Mantissa 220; TWT Channel 222; NDP Paging 224; and Link ID Bitmap 226. The Link ID Bitmap 226 indicates the links to which the TWT element is applied.

Figure 2C:
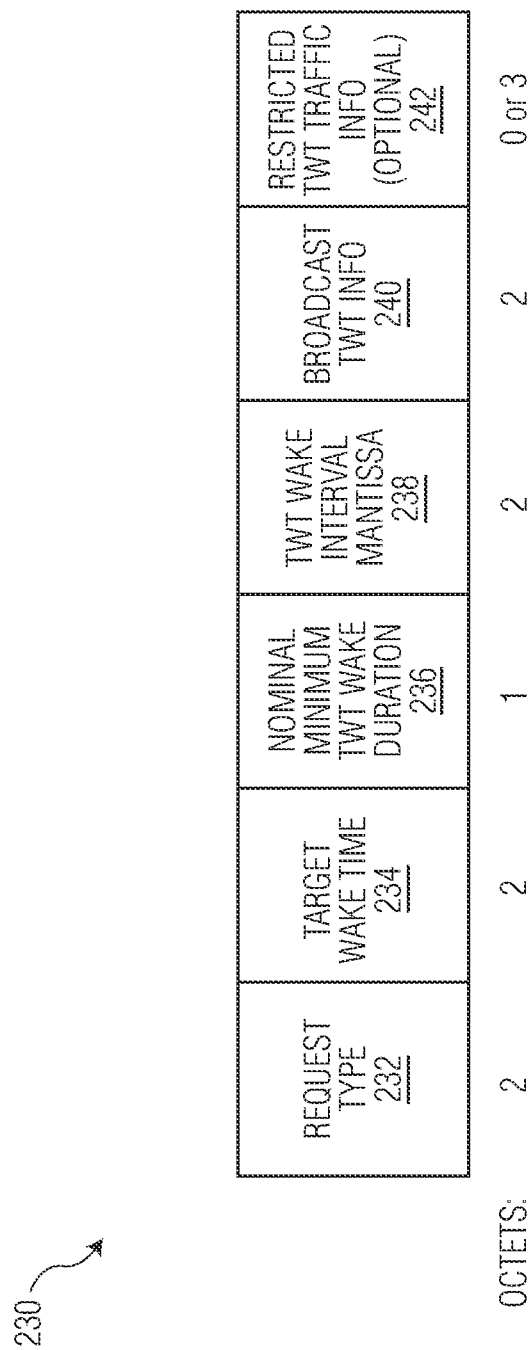
FIG. 2C illustrates the Broadcast TWT Parameter Set format.

FIG. 2C illustrates the Broadcast TWT Parameter Set format. The Broadcast TWT Parameter Set includes the following fields: Request Type 232; Target Wake Time 234; Nominal Minimum TWT Wake Duration 226; TWT Wake Interval Mantissa 238; Broadcast TWT Info 240; and Restricted TWT Traffic Info 242. The Restricted TWT Traffic Info field 242 is an optional field that may indicate restricted TWT Traffic Information which indicates the allowed frame exchanges of the indicated TIDs by Restricted TWT Traffic Info field in the TWT SPs. The insertion of the Broadcast TWT element is a critical update.

The various definitions of the various TWT fields and elements described in FIGS. 2A-C leads to a few open question. The APs of an AP MLD have different TSF times in different links. The definition of TWT Wake Time is not clear when the TWT negotiation establishes TWT schedule in multiple links through indicating the applied links through link bitmap in TWT element. In multiple links, the TWT service periods (SPs) may have the same start time, TWT Wake Interval, and TWT Duration. Therefore, the non-AP MLDs may need to monitor multiple links. Further, a non-EHT STA may incorrectly decode the Broadcast TWT Parameter Set field if a TWT element is allowed to include multiple Broadcast TWT Parameter Set fields.

When TWT parameters are specified for only one link and the TWT negotiation can be done through cross link, the following two methods may be used together. First the Address 3 field in the MAC header (i.e., the BSSID field in management) indicates where the TWT Setup frame is applied. Second, the TWT element in TWT Setup frame indicates the link where the TWT Setup frame is applied. The two methods may be used exclusively, e.g., when Address 3 indicates a link where the TWT SP is applied, the TWT element will not indicate the link, e.g., in Link ID Bitmap field 226. When one TWT negotiation negotiates the TWT agreement (individual or broadcast TWT agreement) for multiple links, the TWT element in TWT Setup frame indicates the links where the TWT Setup frame is applied.

A non-AP MLD may have a number of radios (simultaneous active links) that is less than the number of links. In this situation, it is not clear how the allowed number of allowed links establishes an individual (or broadcast) TWT agreement. If the number of links for establishing an individual TWT agreement is more than the number of radios that a non-AP MLD includes, the AP MLD may not know the links that the non-AP MLD will work on. Four different solutions to address this situation will now be described.

In the first solution, a non-AP MLD whose number of radios is less than the number of links cannot establish an individual (or broadcast) TWT agreement in a number of links greater than the number of radios of the non-AP MLD unless:
  when the non-AP MLD is in eMLSR/eMLMR mode, the established TWT agreement may be applied to links that are all of links in eMLSR/eMLMR mode or a part of the number of links in eMLSR/eMLMR mode; or
  when the non-AP MLD has disabled links so that the enabled links indicated in Link ID Bitmap of the TWT element are not greater than the number of radios of non-AP MLD.

Three examples are presented to show situations where this issues might arise. In the first example, a non-AP MLD with three links and two radios cannot establish individual TWT agreements through a TWT element whose Link ID Bitmap indicates more than two links. In the second example, a MLSR non-AP MLD cannot establish individual TWT agreements through a TWT element whose Link ID Bitmap indicates more than one link. In a third example, an eMLSR non-AP MLD with three links in eMLSR mode can establish individual TWT agreements through a TWT element whose Link ID Bitmap indicates no more than three links.

In the second solution, if a non-AP MLD whose number of radios is less than the number of links established, the individual (or broadcast) TWT agreements are negotiated with same TWT SP start time, TWT interval, and TWT duration separately in the different links. These individual (or broadcast) TWT agreements with same TWT SP start time, TWT interval, and TWT duration cannot be in the links that exceed the number of radios of the non-AP MLD unless:
  when the non-AP MLD is in eMLSR/eMLMR mode, the established TWT agreement may be in links that are all of the links in eMLSR/eMLMR mode or a part of the number of links in eMLSR/eMLMR mode; or
  when the non-AP MLD has disabled links so that the number of enabled links with those TWT elements is no more than the number of radios of non-AP MLD.

The third solution may be a generalization of the second solution wherein the individual (or broadcast) TWT agreements in different links have TWT SPs that partially overlap with each other, i.e., the TWT SP start times may be different and/or the TWT interval and/or the TWT duration may be different for the different links.

In the fourth solution, a non-AP MLD may establish individual (or broadcast) TWT agreements in a number of links that is greater than the number radios of the non-AP MLD. Accordingly, the AP MLD will have the same number of active frame exchanges with the non-AP MLD as the radios of the non-AP MLD, and the AP MLD will not try to do frame exchanges with the non-AP MLD in other links in excess of the number of radios.

Figure 3A:
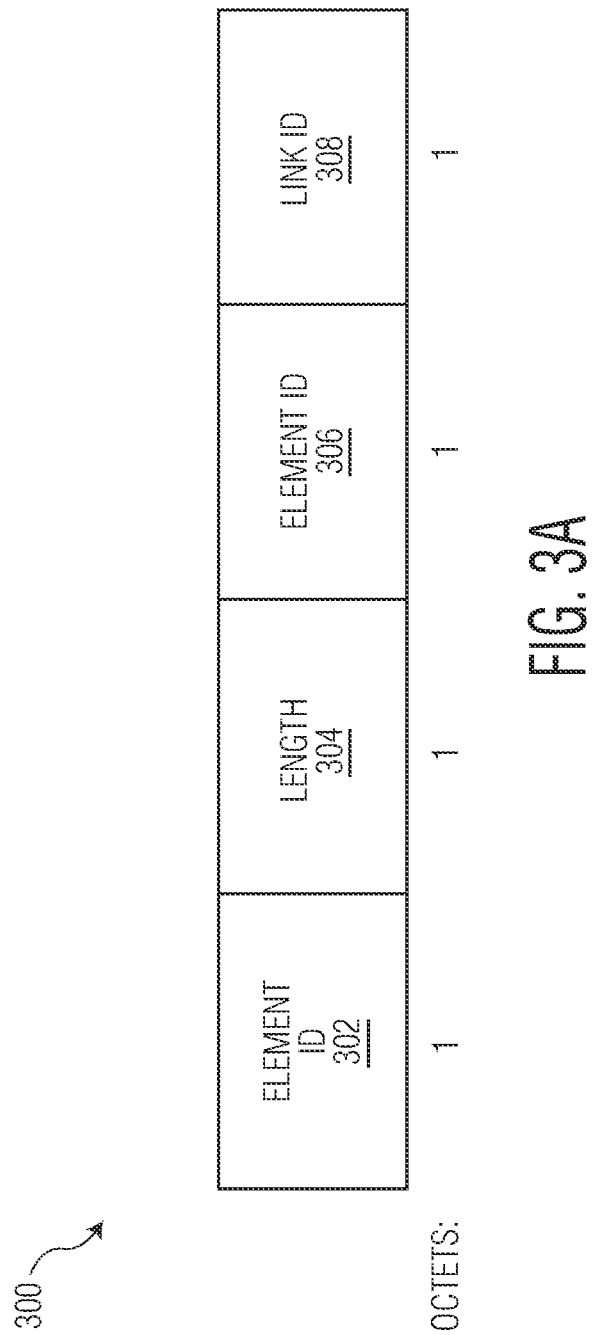
FIG. 3A illustrates an embodiment of a data element that may be included in the teardown frame.
Figure 3B:
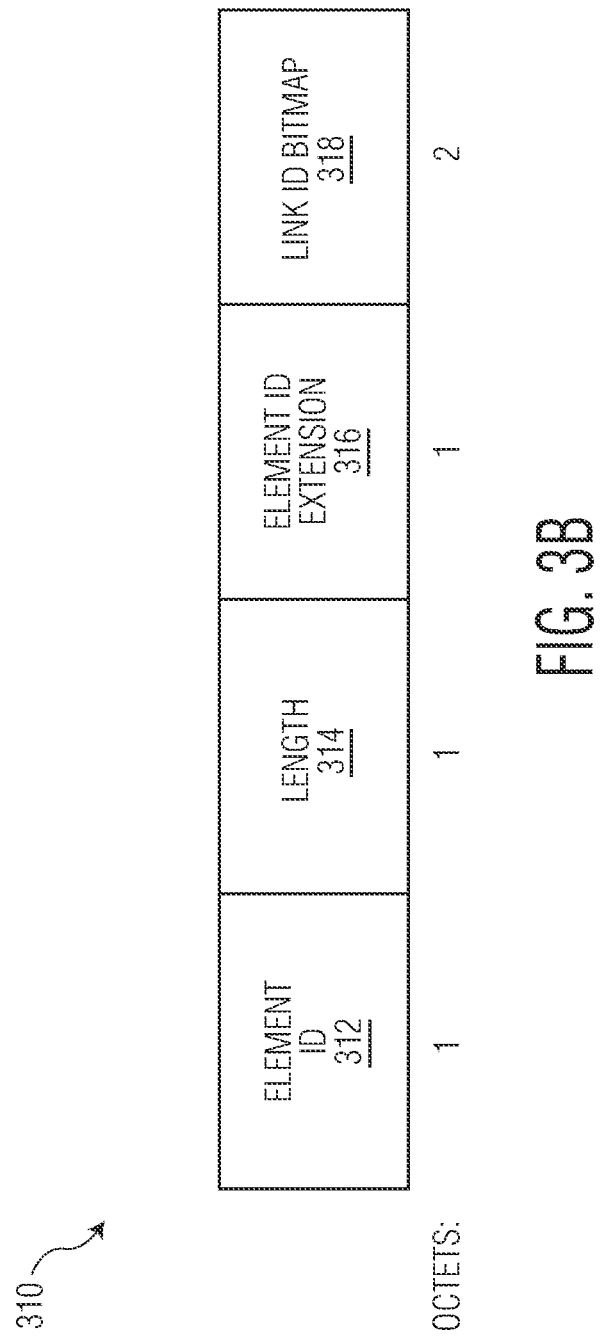
FIG. 3B illustrates another embodiment of a data element that may be included in the teardown frame.

TWT Teardown frames may be used tear down individual (or broadcast) TWT agreements. FIG. 3A illustrates an embodiment of an element that may be included in the teardown frame. The data element 300 may include an Element ID 302, Length 302, Element ID Extension 306, and a Link ID 308. FIG. 3B illustrates another embodiment of a data element that may be included in the teardown frame. The data element 310 may include an Element ID 312, Length 312, Element ID Extension 316, and a Link ID bitmap 318. One or more of data elements 300 and/or 310 may be included TWT Teardown frame to identify individual TWT agreements where the teardown of individual TWT agreement is carried out.

A TWT Information frame may be used to suspend/resume TWT agreements. TWT Information frame may include one or more of the elements 300 and 310 (as shown in FIGS. 3A and 3B) to indicate the links where the suspension/resumption of individual TWT agreement is applied.

Figure 4:
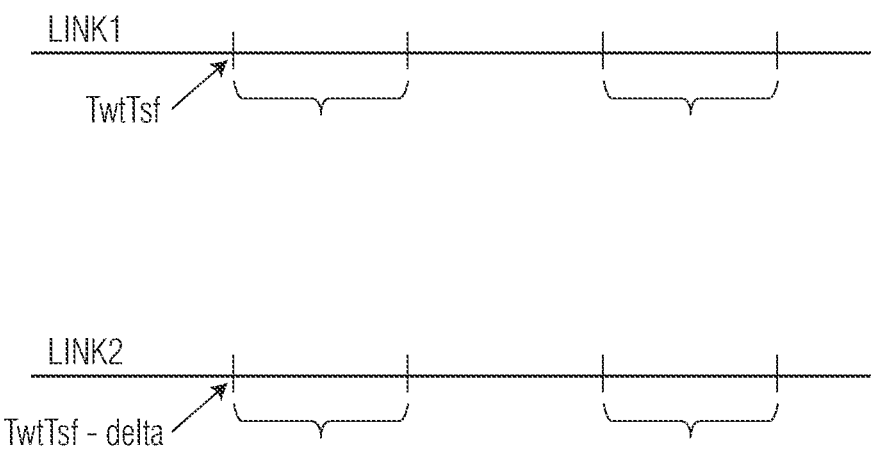
FIG. 4 illustrates the different TSF start times for different links with different Beacon transmission times.

In multi-link operation (MLO) the TWT Wake time of Individual (or broadcast) TWT needs to be determined. The TWT Wake Time announces the timing synchronization function (TSF) time of a specific link that is included in Link ID Bitmap (i.e., the related bit for the link in the Link ID Bitmap is not 0). If the APs associated with the different links have different Beacon transmission times and hence different TSF times, the individual (or broadcast) TWT in links other than the specific link will have TWT start time as shown in FIG. 4. Four different solutions for setting the TWT Wake Time for individual TWTs under MLO will be described. In a first solution, the TWT Start Time is the TSF time of the link whose related bit is not 0 (i.e., there is a TWT agreement for that link specified) in the Link ID Bitmap 318, and link indicated by the Link ID has smallest value (or alternative the largest value as another example). Assume the TWT agreements are established in link 1 and link2 where the TWT Start Time in the TWT element is TwtStartTime. The TSF time of the AP in link1 is 100 TUs (delta) more than the TSF time of the AP in link2. TwtStartTime will be the TSF time of link1 when the TWT agreement in link1 starts. TwtStartTime−100TUs (or TwtStartTime−Delta) will be the TSF time of link2 when the TWT agreement in link2 starts. In a second solution, the TWT Start Time is the TSF time of the link that is indicated by Address 3 (BSSID field) in MAC header of TWT Setup frame if Address 3 indicates the link to which the frame is applied. In a third option, the TWT Start Time is the TSF time of the link that is indicated by adding a new field in TWT element, e.g., Link ID field in TWT element. In a fourth solution, the TWT Start Time is the TSF time of the link that is indicated by including a new element where the element includes the Link ID field in the TWT Setup frame. In a fifth solution, the TWT Start Time is the TSF time of the link where the TWT Setup frame is transmitted. Assume the TWT agreements are established in link 1 and link2 where the TWT Start Time in the TWT element transmitted in link1 is TwtStartTime. The TSF time of the AP in link1 is 100 TUs (delta) more than the TSF time of the AP in link2. TwtStartTime will be the TSF time of link2 when the TWT agreement in link2 starts. TwtStartTime+100TUs (or TwtStartTime+Delta) will be the TSF time of link1 when the TWT agreement in link1 starts.

In another embodiment, the Link Indication of an individual TWT under MLO may be implemented as follows. Instead of carrying a Link ID Bitmap, an alternative method to carry link information is that TWT Setup frame includes the new element to carry link information such as that shown in FIG. 3A or FIG. 3B.

The insertion of broadcast TWT element is a critical update in HE. But issues remain with the broadcast TWT critical update because an AP may explicitly terminate a broadcast TWT agreement through a Beacon frame. Further, an AP may insert a Broadcast TWT Parameter Set field, e.g., for updating the broadcast TWT parameters.

The following actions may also be part of the broadcast TWT critical update: insertion of Broadcast TWT Parameter Set field; terminating a broadcast TWT agreement through announcing Reject TWT in TWT Setup Command field; updating a broadcast TWT agreement through announcing Alternate TWT in TWT Setup Command field; removing the Broadcast TWT Parameter Set field or Broadcast TWT element; and updating of No Member Indication of rTWT Parameter Set field.

Figure 5:
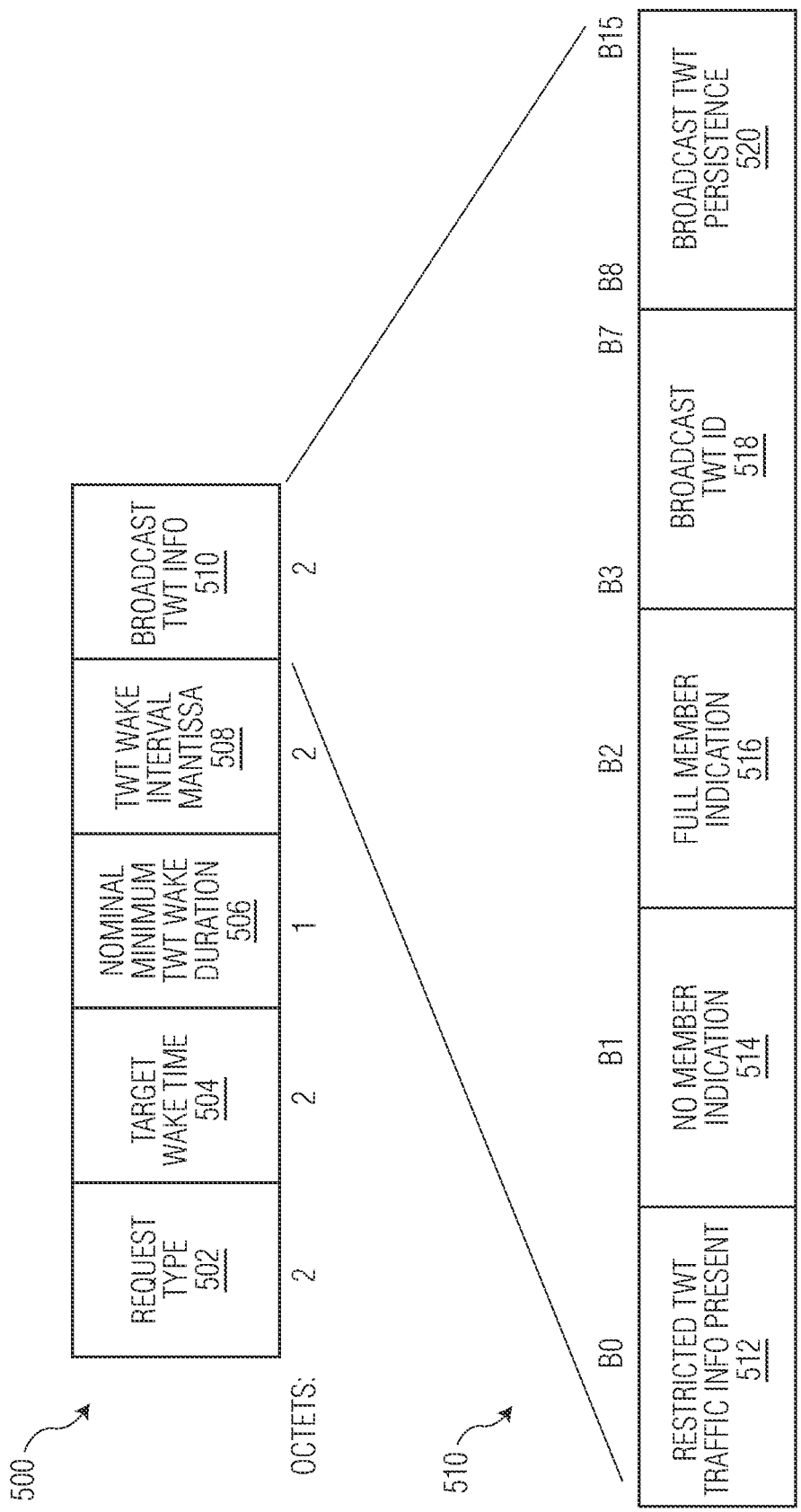
FIG. 5 illustrates the Broadcast TWT Parameter Set field format as well as a more detailed view of the Broadcast TWT Info field.

When restricted TWT (rTWT) is used, the link membership of the rTWT needs to be indicated. The rTWT restricts the usage of the medium to only that traffic associated with the rTWT and may allow for low latency traffic to be reliably transmitted. As a result, if another transmission opportunity (TXOP) would extend into the rTWT time, the TXOP must stop operation at the beginning of the rTWT. Indicating whether a rTWT includes members and whether a rTWT allows additional members may help a STA's operation. For example, if a rTWT currently has no members, then a TXOP may extend past the start rTWT because there are no members to use the rTWT. FIG. 5 illustrates the Broadcast TWT Parameter Set field format 500 as well as a more detailed view of the Broadcast TWT Info field 510. The Broadcast TWT Parameter Set includes the following fields: Request Type 502; Target Wake Time 504; Nominal Minimum TWT Wake Duration 506; TWT Wake Interval Mantissa 508; and Broadcast TWT Info 510. The Broadcast TWT Info field 510 includes a Restricted TWT Traffic Info Present bit 512, a No Member Indication bit 514, Full Member Indication bit 516, Broadcast TWT ID bits, and Broadcast TWT Persistence bits 520. The rTWT membership indication may include the following steps. In the Broadcast TWT Info field 510, the 1-bit No Member Indication 514 field being equal to 1 means that there are no members in the rTWT. Therefore, the STAs supporting rTWT do not need to stop its TXOP at the beginning of the SP of the rTWT. In Broadcast TWT Info field 510, the 1-bit Full Member Indication field 516 being equal to 1 means that the AP will not accept the membership request for the rTWT.

Figure 6:
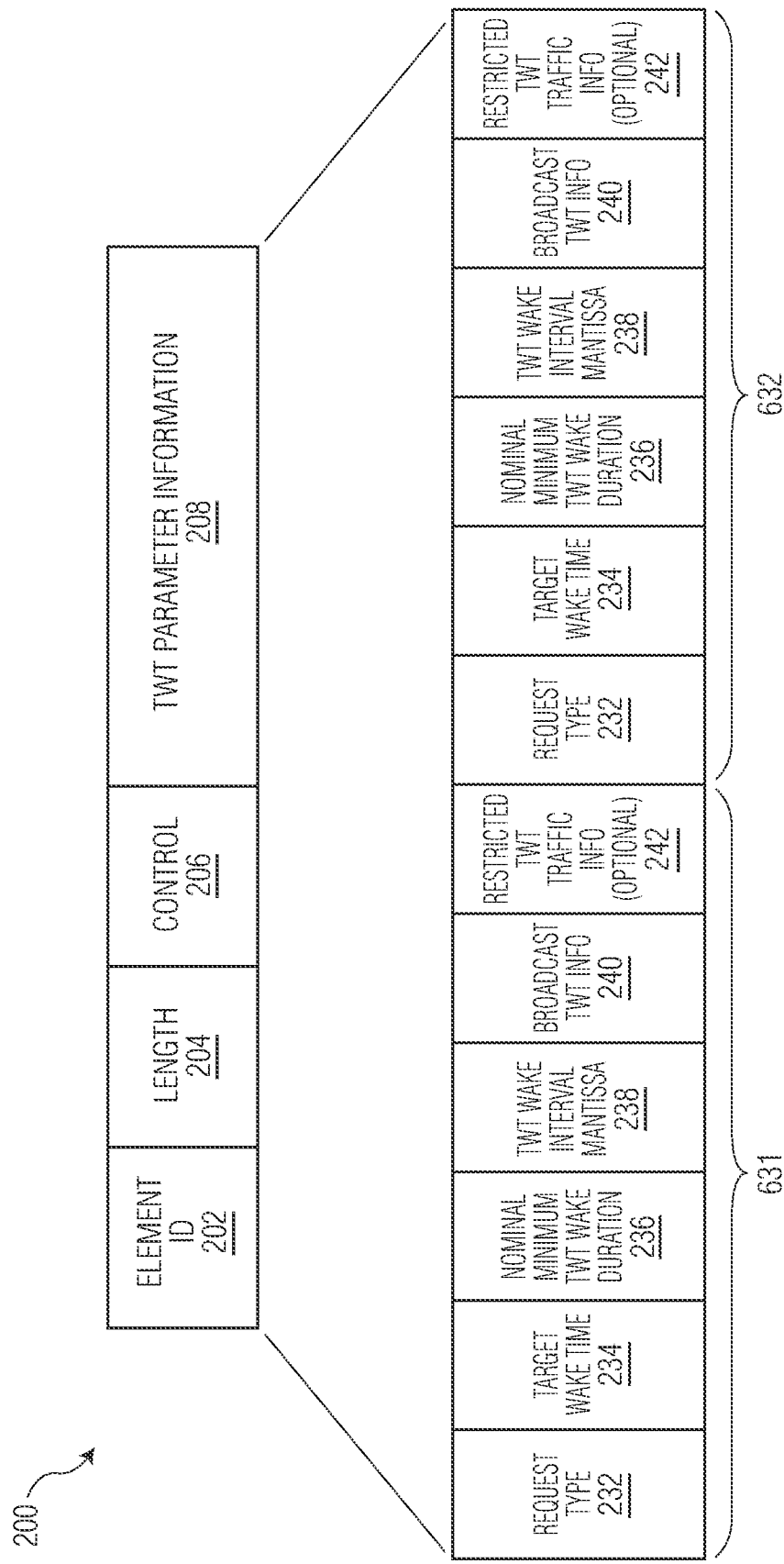
FIG. 6 illustrates the TWT element having two Broadcast TWT Parameter Set fields.

An issue arises when a Broadcast TWT Parameter Set field is received by a non-EHT STA. FIG. 6 illustrates the TWT element 200 having two Broadcast TWT Parameter Set fields 631 and 632. A non-EHT STA cannot figure out the Broadcast TWT Parameter Set fields 631 and 362 in a TWT element 200 when Broadcast TWT Parameter Set fields 631 and 632 include Restricted TWT Traffic Info filed 242. Three different solutions to this issue will be described.

In a first solution, when a Broadcast TWT Parameter Set field 631 and 632 in a broadcast frame (e.g., Beacon) includes the Restricted TWT Traffic Info field 242, the TWT element 200 that includes the Broadcast TWT Parameter Set field 631 will not carry another Broadcast TWT Parameter Set field 632. One exception is that if all associated STAs are EHT STAs, the TWT element 200 in a broadcast frame may carry the Broadcast TWT Parameter Set fields 631 and 632 with optional Broadcast TWT Traffic Info fields 242. An alternative embodiment to this is that when a TWT element 200 in a broadcast frame includes multiple Broadcast TWT Parameter Set fields 631 and 631, only the last Broadcast TWT Parameter field 242 (i.e., the Broadcast TWT Parameter field 242 in 632) in the TWT element 200 may carry the Restricted TWT Traffic Info field 242. The Restricted TWT Traffic Info field 242 may be generalized to any optional fields in Broadcast TWT Parameter Set field 631 and 632 in broadcast frames.

In a second solution, instead of carrying the Broadcast TWT Parameter Set field 631 or 632 including the rTWT information in TWT element 200, a new element may be defined to carry the Broadcast TWT Parameter Set field(s) 631 and/or 632 including the rTWT information.

In a third option, the optional fields for rTWT (e.g., Restricted TWT Traffic Info field 242) may be carried in a separate newly defined element where the optional fields are identified by broadcast TWT ID in the new defined element. Then the Broadcast TWT Parameter Set fields 631 and/or 632 in TWT element 202 have no optional field(s).

In rTWT the SP negotiated by the TWT element with TWT Traffic Info field, the frames of the TIDs (low latency traffic TIDs) indicated by the TWT Traffic Info field will be transmitted first. In one embodiment, the Basic Trigger frame that solicits the low latency traffic in rTWT SP indicates one of the negotiated low latency traffic TIDs through a Preferred AC field. In one embodiment, the AC value in the Preferred AC field for a STA (User Info field in Basic Trigger frame whose AID12 is STA's partial AID) will be mapped by one of the negotiated low latency TIDs through rTWT negotiation initiated by the STA. In one embodiment, if a STA and the AP negotiates rTWT membership with one or multiple low latency TIDs for a rTWT schedule, in rTWT SPs of the rTWT schedule, the AP transmits a Basic Trigger frame with User Info field for the STA whose Preferred AC is mapped by one of the negotiated low latency traffic TIDs to solicit low latency traffic. In one embodiment, in rTWT SPs of the rTWT schedule where a STA is the member of rTWT SPs, after receiving Basic Trigger frame, if the STA has buffered frames of the low latency traffic, the STA needs to transmit the frames from the TIDs that are mapped to the Preferred AC field in the associated User Info field with the following exception: the STA can transmit the buffered frames from the other low latency traffic TIDs negotiated for the rTWT SP.

In one embodiment, the rTWT SP can be used for trigger TXOP sharing. When an AP transmits a MU RTS TXS frame in rTWT SP to allocate its TXOP time for low latency Traffic, the solicited low latency traffic TID can be indicated in User Info field or the Common Info field. In one embodiment, the User Info field carries the 2-bit Preferred AC field or 3-bit Low Latency TID field. In another embodiment, the Common Info field carries the 2-bit Preferred AC field or 3-bit Low Latency TID field. In one embodiment, if a STA and the AP negotiates rTWT membership with one or multiple low latency TIDs for a rTWT schedule with triggered TXOP sharing operation, in rTWT SPs of the rTWT schedule for triggered TXOP sharing, the AP transmits MU-RTS TXS with to the STA whose Preferred AC is mapped by one of the negotiated low latency traffic TIDs or whose Low Latency TID is one of the negotiated low latency traffic TIDs. In one embodiment, in rTWT SPs of the rTWT schedule for triggered TXOP sharing where a STA is the member of rTWT SPs, after receiving MU-RTS TXS frame, if the STA has buffered frames of the low latency traffic, in the allocated time by MU-RTS TXS, the STA needs to transmit the frames from Low Latency TID or the TID that is mapped to the Preferred AC field with the following exception: the STA can transmit the buffered frames from the other low latency traffic TIDs negotiated for the rTWT SP.

HE defines subchannel selective transmission (SST), which allows 80 MHz operating STAs to park in secondary 80 MHz channel in negotiated TWT SPs in 160 MHz BSS (for 160 MHz OFDMA) or 20 MHz operating STAs to operate in 80/160 MHz BSS. For example a 160 MHz channel may have a primary 80 MHz subchannel and a secondary 80 MHz channel. This allows for full usage of 160 MHz channel when most associated STAs don't support 160 MHz bandwidth. SST is supported in individual TWT. Because Broadcast TWT supports membership establishment, it is natural to extend SST to broadcast TWT. Accordingly, when a STA negotiates broadcast TWT membership, the temporary channel in broadcast TWT SP is negotiated.

The operation and use of TWT under enhanced single radio (SR)/multi-radio (MR) mode will now be described.

The establishment of Individual TWT agreements will first be described. Synchronized individual TWT agreements have same TWT parameters except the applied link IDs.

In a first option, an enhanced MLSR STA MLD negotiates individual TWTs for all links in eMLSR mode with the AP MLD through one TWT Request/Response. In one variation, the acceptance of the TWT agreement means that TWT agreements in all the links are accepted. With this variation the link indication, e.g. link bitmap, is not needed. In a second variation, the acceptance of the TWT agreement allows the TWT agreement in a subset of the links. With this variation, the link indication, e.g. link bitmap, is needed.

In a second option 2, an enhanced MLSR STA MLD negotiates individual TWTs for some links in eMLSR mode with the AP MLD through one TWT Request/Response. The acceptance of the TWT agreement allows the TWT agreement in a subset of the requested links. With this option, the link indication, e.g. link bitmap, is needed.

In another situation, the minimal number of links of synchronized individual TWT agreement of STA MLD in enhanced SR/MR mode (eMLSR/eMLMR mode) may be implemented. In a first option, synchronized individual TWT agreements in at least two links are negotiated (i.e., the TWT SPs simultaneous start and end at the same time in at least two links). In a second option, there is no requirement that the synchronized TWT agreements are in at least two links. In this option, the enhanced SR/MR STA MLD can establish TWT agreement in one link only. Under this option in one embodiment, the eMLSR/eMLMR STA MLD is in MLSR/MLMR mode implicitly in the negotiated TWT SP. With this, the initial control frame long enough (through trigger frame padding) transmitted by AP for radio switch at the beginning of the frame exchanges is not needed. Under this option in another embodiment, the initial control frame long enough transmitted by AP for radio switch at the beginning of the frame exchanges is still transmitted. Under this option in yet another embodiment, the initial control frame without padding transmitted by AP for radio switch at the beginning of the frame exchanges is still transmitted.

Individual TWT agreement suspension/resumption and teardown will now be described. When synchronized individual TWT agreements are in all links, the TWT suspension/resumption and teardown may be done through a single related Action (TWT Teardown, TWT Information respectively) transmission. The link information, e.g. link ID bitmap, is not needed in TWT Teardown and/or TWT Information frame.

When synchronized individual TWT agreements apply to a subset of the links in enhanced MLSR/MLMR mode, the TWT suspension/resumption and teardown may be done through a single related Action (TWT Teardown, TWT Information respectively) transmission. The link information, e.g. link ID bitmap, is needed in the TWT Teardown, TWT Information frame.

The use of Broadcast TWT under the enhanced SR/MR mode will now be described. In a first option, when an eMLSR/eMLMR STA MLD is a member of synchronized broadcast TWT agreements, the eMLSR/eMLMR STA MLD is in eMLSR/eMLMR mode in the related TWT SPs. When an eMLSR/eMLMR STA MLD is the member of a broadcast TWT agreement that has no synchronized broadcast TWT agreement, the eMLSR/eMLMR STA MLD is implicitly in MLSR/MLMR mode in the related TWT SPs.

In a second option, an eMLSR/eMLMR STA MLD will be in eMLSR/eMLMR mode even in a broadcast TWT SP that has no synchronized broadcast TWT agreement.

When an AP of AP MLD receives the responding frame solicited by Trigger frame from an eMLSR/eMLMR STA MLD in a link within synchronized TWT SP, the AP MLD assumes that all the STAs of the STA MLD in eMLSR/eMLMR mode are ready to receive data/management frame or be scheduled to transmit TB PPDUs with data/management frames.

In certain situations, there will be Link-specific Management Frames transmitted under multi-link operation. For example, besides sounding related frames, range measurement frames, the following frames are link specific per link level frames: TPC Request, TPC Response; and link Measurement Request, Link Measurement Report.

Further, a TWT Information frame may be treated as cross-link per link frame. After receiving the Ack frame in a TWT SP solicited by TWT Information frame that suspends a TWT SP, TWT suspension of the TWT agreement takes effect in the synchronized TWT agreements after the TWT SP. With this relaxed condition, the immediate notification of cross-link TWT Information frame received in one link to another link is not needed.

The sequence numbers may be used in the MAC header to allow the order of received packets to be restored upon receipt of a number for frames. Various management frames are sent with sequence numbers, and there are different categories of management frames that are sent. Various options will now be described regarding how to handle various types of management frames using different IP sequence number spaces.

In a first solution, the MLD level Management frames that are not QoS Management Frames (QMF) have one MLD level sequence number space. The MLD level Management frames that are QMFs have one MLD level sequence number space for each access category (AC). The per-link management frames that are not QMFs in each link has one sequence number space. At any time, if one management frame from one sequence number space is not acknowledged, another frame from the same sequence number space is not allowed to be transmitted. At the recipient, the duplication detection is done independently for each sequence number space.

In a second solution, the MLD level Management frames and cross-link per-link management frames that are not QMF have one MLD level sequence number space. The MLD level Management frames and cross-link per-link management frames that are QMF have one MLD level sequence number space for each AC. The link specific per-link management frames that are not QMF in each link has one sequence number space. At any time, if one management frame from one sequence number space is not acknowledged, another frame from the same sequence number space is not allowed to be transmitted. At the recipient, the duplication detection is done per each sequence number space.

In a third solution, the MLD level Management frames and per-link management frames that are not QMF have one MLD level sequence number space. The MLD level Management frames and per-link management frames that are QMF have one MLD level sequence number space for each AC. At any time, if one management frame from one sequence number space is not acknowledged, another frame from the same sequence number space is not allowed to be transmitted. At recipient, the duplication detection is done per each sequence number space.

The system and method described herein may be carried out using specific hardware to perform the actions or software running on a processor may implement the embodiments. The processor may be connected to memory and storage, where the software instructions are stored in the storage. The processor may be any general purpose processor, a graphics processor, a signal processor, or any other type of specialized processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A multi-link device (MLD) access point configured to establish a target wake time (TWT) with an MLD station, wherein a plurality of links are established between the MLD access point and the MLD station, comprising:
   a transmitter configured to:
   transmit a TWT set up frame to the MLD station configured to indicate whether the TWT set up frame is applied to multiple links of the plurality of links;
   announce a broadcast TWT by transmitting a TWT element with just one Broadcast TWT Parameter Set field if the one Broadcast TWT Parameter Set field includes optional fields; and
   negotiate with the MLD station an individual TWT for multiple links, through the TWT element wherein the number of the multiple links to which the individual TWTs applies is less than or equal to the number of radios of the MLD access point and the MLD station, and the number of the multiple links to which the individual TWT applies is up to the total number of links when the MLD station is an enhanced multi-link single radio/enhanced multi-link multi-radio (eMLSR/eMLMR) mode.

2. The MLD access point of claim 1, wherein the individual TWT Wake time is a time synchronization function (TSF) time of a link with a smallest link ID.

3. The MLD access point of claim 1, wherein the individual TWT Wake time is a time synchronization function (TSF) time of a link with a largest link ID.

4. The MLD access point of claim 1, wherein the transmitter is further configured to tear down the individual TWT by transmitting to the MLD AP a single frame that is applied to more than one link of the number of the multiple.

5. He MLD access point of claim 1, wherein the transmitter is further configured to send a single frame that may be applied to more than one link of the number of the multiple to suspend or resume the individual TWT.

6. The MLD access point of claim 1, wherein an update related to the broadcast TWT includes the insertion of the Broadcast TWT Parameter Set field.

7. The MLD access point of claim 1, wherein the update related to the broadcast TWT includes the termination of a broadcast TWT agreement through announcing a Reject TWT in a TWT Setup Command field.

8. The MLD access point of claim 1, wherein the update related to the broadcast TWT includes the update of the broadcast TWT agreement through announcing an Alternate TWT in the TWT Setup Command field.

9. The MLD access point of claim 1, wherein the one Broadcast TWT Parament set field includes a Broadcast TWT Info field, and the Broadcast Info field includes a No Member Indication field that indicates whether there are no members in a restricted TWT.

10. The MLD access point of claim 9, wherein the MDL STA that supports the restricted TWT does not need to stop its transmit opportunity at the beginning of the service period of the restricted TWT when there are no members in the restricted TWT.

11. The MLD access point of claim 1, wherein the one Broadcast TWT Parament set field includes a Broadcast TWT Info field, and the Broadcast Info field includes a Full Member Indication field that indicates whether the MLD access point will accept a membership request for a restricted TWT.

12. The MLD access point of claim 1, wherein the Broadcast TWT Parament set field includes a restricted TWT Traffic Info field.

13. The MLD access point of claim 1, wherein the TWT element includes a plurality of Broadcast TWT Parament set fields, and only the last of the plurality of Broadcast TWT Parament set fields includes the restricted TWT Traffic Info field.

14. The MLD access point of claim 1, wherein when the MLD STA negotiates TWT membership, a temporary channel in a broadcast TWT SP is negotiated in a subchannel selective transmission secondary channel.

15. A multi-link device (MLD) access point configured to establish communication with an enhanced multi-link single radio/enhanced multi-link multi-radio (eMLSR/eMLMR) MLD station, the multi-link device (MLD) access point, comprising:
a transmitter configured to:
transmit a TWT set up frame to the (eMLSR/eMLMR) MLD station configured to indicate whether the TWT set up frame is applied to multiple links of the plurality of links;
announce a broadcast TWT by transmitting a TWT element with just one Broadcast TWT Parameter Set field if a Broadcast TWT Parameter Set field includes optional fields; and
negotiate with the MLD station an individual TWT for multiple links, through one TWT element,
wherein the number of the multiple links to which the individual TWT applies is less than or equal to the number of radios of the MLD access point and the MLD station, and
the number of the multiple links to which the individual TWT applies is up to the total number of links when the MLD station is an enhanced multi-link single radio/ enhanced multi-link multi-radio (eMLSR/eMLMR) mode.

16. The MLD access point of claim 15, wherein the negotiated individual TWT for the multiple links is accepted in all links in the eMLSR mode.

17. The MLD access point of claim 15, wherein the negotiated individual TWT for the multiple links is accepted in a subset of links in the eMLSR mode.

18. The MLD access point of claim 15, wherein the negotiated individual TWT for the multiple links is a synchronized TWT agreement in all the links that have same TWT parameters except applied links.

19. The 1A1) access point of claim 15, wherein the transmitter is further configured to transmit a single TWT suspension resumption action frame that suspends/resumes the synchronized TWT agreements in all the links.

20. The MLD access point of claim 15, wherein the transmitter is further configured to transmit a single TWT teardown action frame to tear down the synchronized TWT agreements in all the links.

* * * * *